UNITED STATES PATENT OFFICE.

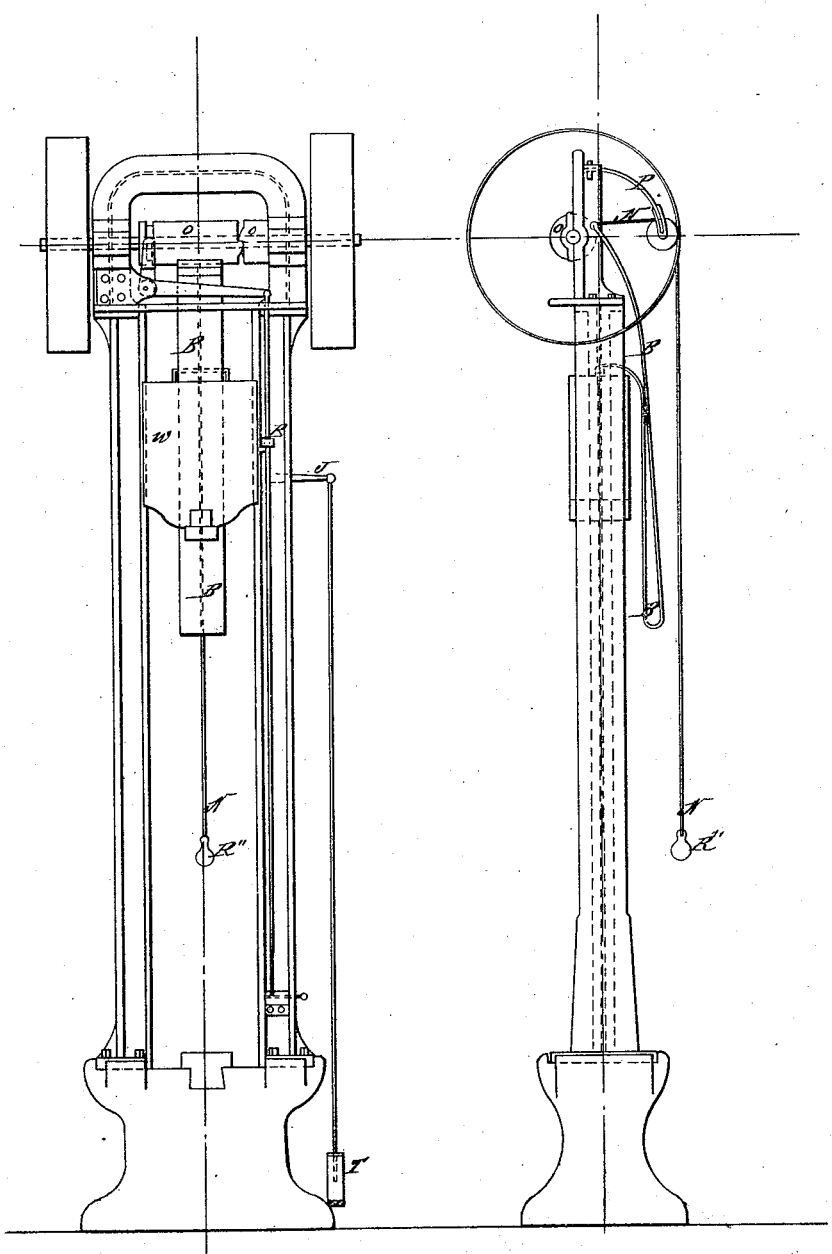

RICHARD S. LAWRENCE, OF HARTFORD, CONNECTICUT.

IMPROVEMENT IN FORGING APPARATUS.

Specification forming part of Letters Patent No. 34,434, dated February 18, 1862.

*To all whom it may concern:*

Be it known that I, RICHARD S. LAWRENCE, of Hartford, in the county of Hartford and State of Connecticut, have invented a new and Improved Drop; and I hereby declare that the following is a full and exact description thereof, reference being had to the accompanying drawing, and to the letters of reference marked thereupon.

The nature of my invention consists of a small belt and weight attached to the spool or drum for the purpose of unwinding the main belt and allow it to hang loose after it has performed its duty on the spool or drum. The drawing represents its application to the spool or drum of a drop.

O represents the spool or drum; N, small belt; R″, small weight; B, main belt; W, main weight; C, clutch; J, latch; R, dog.

The main belt B, it will be sufficient to say, is attached to the spool or drum O, as in the common drop, or in any convenient manner, and in the same way to the main weight W. The small belt N may be attached to the spool or drum O or to the main belt B, whichever may prove the most convenient, from thence horizontally through pulley P, and then downward to whatever distance required.

The drop being put in action, the spool or drum O revolves, carrying with it the main belt B and the small belt N, which continue winding in concert until the main weight W comes in contact with the dog R, which throws the spool or drum O out of gear. As soon as the spool or drum O is thrown out of gear, both belts are immediately unwound by means of small weight R″, which is attached to small belt N, leaving the main belt B hanging perfectly free, as shown in drawing, and the main weight W is also caught and held in its place by means of the catch J.

In my improved plan the difficulties before encountered in the common belt-drop are obviated in the most simple manner, first, by dispensing with the friction caused by the unwinding of the belt, which undoubtedly retards the velocity of the weight while falling, and therefore the blow is not as effective as it would be were the belt perfectly free, and, secondly, after the spool or drum is unclutched the belt B is relieved from the strain of the weight W and hangs perfectly loose, which is a highly-important feature, as the backlash caused by the unwinding is entirely avoided.

Attempts hitherto have failed partially or entirely for the reason that the belt was not only rapidly destroyed by the unwinding, but proved dangerous to operatives, as the weight was entirely dependent on the belt, and in case of a fracture of the belt liable to fall at any time. By my invention all these difficulties, which have proved so disastrous to belt-drops, are entirely overcome.

Having thus described my invention, what I claim as new, and desire to secure by Letters Patent, is—

An auxiliary weight and belt, combined with the pulley or drum of a drop or with the belt or strap or other appliance used to raise the drop-weight, for the purpose set forth.

RICHARD S. LAWRENCE. [L. S.]

Witnesses:
WILLIAM HUNGERFORD,
WM. R. CONE.